United States Patent Office 3,479,401
Patented Nov. 18, 1969

---

3,479,401
GUANIDINOARYL AND GUANIDINOMETHYL-ARYL COMPOUNDS
Arthur A. Patchett, Cranford, and Edward F. Rogers, Middletown, N.J., and William J. Leanza, Staten Island, N.Y., assignors to Merck & Co., Inc., Rahway, N.J., a corporation of New Jersey
No Drawing. Continuation-in-part of application Ser. No. 477,629, June 18, 1965. This application June 28, 1966, Ser. No. 561,052
Int. Cl. C07d 99/14; C07c 101/44, 101/48
U.S. Cl. 260—518     7 Claims

ABSTRACT OF THE DISCLOSURE

Quanidinoaryl or guanidinomethylaryl substituted organic acids and their corresponding acid halides are used as acylating agents in the preparation of novel substituted penicillins. The penicillins produced thereby are useful in the therapy of infections particularly those due to gram positive bacteria.

---

This application is a continuation-in-part of Ser. No. 477,629 filed June 18, 1965, now abandoned which is a division of Ser. No. 287,783 filed June 14, 1963, now abandoned, which, in turn, is a continuation-in-part of Ser. No. 207,036 filed July 2, 1962, now abandoned.

This invention relates to new antibiotic compounds and methods of preparing the same. More particularly, it is concerned with new penicillins, salts thereof, intermediates, and processes for preparing these products.

The penicillins having the general formula:

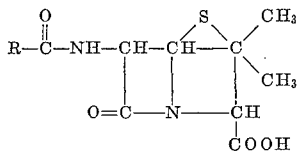

wherein R represents an oragnic radical, have been found to be invaluable in the therapy of infections, particularly those due to gram-positive bacteria. Thus, penicillins such as benzylpenicillin and phenoxymethylpenicillin are widely used in the treatment of various infections. Although penicillins have found widespread use, the presently-known penicillins do suffer from one or more disadvantages. For example, some of the penicillins, such as benzylpenicillin, have comparatively low in vivo activity even when administered parenterally. Some of the penicillins are ineffective against certain gram-negative strains of bacteria and the use of these penicillins must therefore be limited to the treatment of infections caused by bacteria susceptible to the action of the penicillin. Accordingly, the search has continued to find other penicillins which do not possess the disadvantages of the known penicillins.

It is an object of this invention to provide penicillins and their salts which are particularly effective against gram-negative bacilli.

Another object is to provide penicillins which have high in vivo activity against infections by such microorganisms.

Still another object is to provide new intermediates and processes for the preparation of such penicillins.

Other objects will be apparent from the detailed description of this invention hereinafter provided.

In accordance with this invention, it is now found that penicillins wherein the acyl group contains a guanidinoaryl or a guanidinomethylaryl radical and the non-toxic acid salts thereof are valuable antibacterial products. These products, which may also be termed 6-(guanidinoarylacylamino)-penicillanic acids, in addition to having enhanced antibacterial activity against gram-negative bacilli, possess high in vivo activity when compared with the corresponding penicillins lacking a guanidino substituent. These new penicillins can be shown structurally as follows:

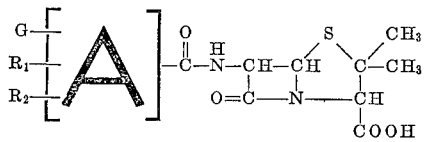

or

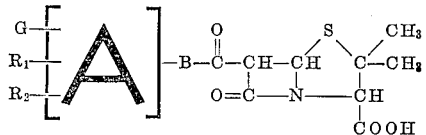

wherein A represents phenyl or naphthyl, B represents lower alkylene, substituted lower alkylene wherein the substituent is lower alkyl or amino, oxylower alkylene, isoxazolylene, or substituted isoxazolylene wherein said substituent is lower alkyl, G represents guanidino or guanidinomethyl, and $R_1$ and $R_2$ represent hydrogen, phenyl, lower alkoxy, halo, amino, or lower alkyl; and non-toxic acid salts thereof.

The new penicillins of the present invention are prepared by reacting a suitable ester of 6-aminopenicillanic acid with a novel organic carboxylic acid having a guanidinoaryl- or a guanidinomethylaryl substituent to produce the corresponding ester of the 6-(guanidinoarylacylamino)-penicillanic acid and then removing the protective ester by catalytic hydrogenation to obtain the desired free acid.

Esters of 6-aminopenicillanic acid suitable for use in carrying out the processes of this invention are those which can be readily cleaved by catalytic hydrogenation. Suitable esters of 6-aminopenicillanic acid that might be mentioned include allyl, benzyl, substituted benzyl, phenyl and the like. Since the benzyl ester is most conveniently prepared, it is presently preferred to use this ester in the preparation of the new penicillins of this invention.

Alternatively, the new penicillins of the present invention are prepared by reacting 6-aminopenicillanic acid or a salt thereof which an acid halide of an oragnic acid having a guanidinoaryl or a guanidinomethylaryl substituent to produce the 6-(guanidinoarylacylamino)-penicillanic acid or its metal salt directly.

The new guanidinoaryl or guanidinomethylaryl substituted organic acids, or the corresponding acid halides, used as the acylating agent in the preparation of the new penicillins of this invention can be represented structurally as follows:

or

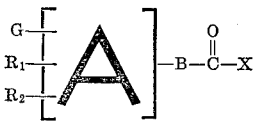

wherein A represents phenyl or naphthyl, B represents lower alkylene, substituted lower alkylene wherein the substituent is lower alkyl or amino, oxylower alkylene, isoxazolylene, or substituted isoxazolylene wherein said substituent is lower alkyl, G represents guanidino or guanidinomethyl, $R_1$ and $R_2$ represent hydrogen, phenyl, lower alkoxy, halo, amino, or lower alkyl, and X represents halogen or hydroxy.

In preparing the new guanidino-substituted carboxylic acids or acid halides used as the acylating agents, the appropriate amino acid is converted to the coresponding carboxylic acid having a guanidino substituent in place of the amino substituent, and the resulting guanidino-substituted carboxylic acid recovered from the reaction mixture. The corresponding acid halide is prepared by reaction of the thus-obtained guanidinocarboxylic acid with a halogenating agent, e.g., thionyl chloride.

The new guanidino-substituted carboxylic acids or acid halides employed as intermediates in the preparation of the novel guanidino-substituted penicillins by reaction with 6-aminopenicillanic acid or esters thereof are of four general types, i.e., a guanidinoarylcarboxylic acid, a guanidinomethylarylcarboxylic acid, a guanidinoaralkylcarboxylic acid or a guanidinomethylaralkylcarboxylic acid.

In accordance with our invention, the guanidino-substituted carboxylic acid may be prepared from the corresponding amino-substituted carboxylic acid by contacting the selected amino acid with s-methylisothionitrourea to yield as an intermediate product the corresponding nitroguanidinocarboxylic acid, which is then converted by catalytic hydrogenation to the desired guanidino-substituted carboxylic acid. The guanidino-substituted carboxylic acid prepared in this manner may be converted to the corresponding acid chloride, e.g., by reaction with thionyl chloride.

In accordance with a preferred method of preparing guanidinoarylcarboxylic acids and guanidinoaralkylcarboxylic acids, the selected aminoaryl- or aminoaralkylcarboxylic acid is intimately contacted with benzoyl cyanamide and the resulting product hydrolyzed to the desired guanidinoaryl- or guanidinoaralkylcarboxylic acid. Thus, for example, p-guanidinobenzoic acid is prepared by intimately contacting p-aminobenzoic acid and benzoyl cyanamide followed by hydrolysis of the reaction product, 5 - methyl-3-(p-guanidinophenyl) - 4-isoxazolylcarboxylic acid, is prepared by the reaction of 5-methyl-3-(p-aminophenyl)-4-isoxazolylcarboxylic acid and benzoyl cyanamide followed by hydrolysis of the reaction product to yield the desired guanidino-substituted acid, and p-guanidinophenylacetic acid is prepared by contacting p-aminophenylacetic acid with benzoyl cyanamide followed by hydrolysis of the resulting reaction product to the desired guanidino acid.

In a preferred method of preparing the guanidinomethylarylcarboxylic acids and the guanidinomethylaralkylcarboxylic acids, the selected aminomethylarylcarboxylic acid or the aminomethylaralkylcarboxylic acid is reacted with o-methylisourea in alkaline solution to produce the corresponding guanidinomethylarylcarboxylic acid or guanidinomethylaralkylcarboxylic acid. Thus, for example, p-guanidinomethylbenzoic acid is prepared by reaction of p-aminomethylbenzoic acid and o-methylisourea in alkaline solution, and p-guanidinomethylphenylacetic acid is similarly obtained from p-aminomethylphenylacetic acid.

In accordance with the above procedures, the following novel guanidino-substituted carboxylic acids, the corresponding acid halides, and salts thereof, are readily prepared from the corresponding amino acids:

2-phenyl-4-guanidinobenzoic acid;
4-guanidino-2-ethoxy-1-naphthoic acid;
2,6-dimethoxy-4-guanidinobenzoic acid;
2-phenyl-4-guanidinomethylbenzoic acid;
4-guanidinomethyl-2-ethoxy-1-naphthoic acid;
2,6-dimethoxy-4-guanidinomethylbenzoic acid;
4-guanidinophenylacetic acid;
2-amino-4-guanidinophenylacetic acid;
4-guanidinophenoxyacetic acid;
2-(4-guanidinophenoxy)-propionic acid;
3-(4-guanidinophenoxy)-propionic acid;
5 - methyl-3 - (4-guanidinophenyl)-4-isoxazolylcarboxylic acid;
4-guanidinophenyl-α-aminoacetic acid;
2-(4-guanidinophenoxy)-butyric acid;
5 - methyl-3 - (2-chloro-4-guanidinophenyl)-4-isoxazolylcarboxylic acid;
4-guanidinomethylphenylacetic acid;
4-guanidinomethylphenoxyacetic acid;
2-(4-guanidinomethylphenoxy)-propionic acid;
5 - methyl-3-(4-guanidinomethylphenyl)-4-isoxazolylcarboxylic acid;
4-guanidinomethylphenyl-α-aminoacetic acid;
2-(4-guanidinomethylphenoxy)-butyric acid;
4-(4-guanidinomethylphenoxy)-butyric acid;
5 - methyl-3-(2-chloro-4-guanidinomethylphenyl)-4-isoxazolylcarboxylic acid;

and 5-ethyl-3-(4-guanidinophenyl)4-isoxazolylcarboxylic acid. By reaction of an acid selected from the foregoing list with a halogenating agent, e.g., thionyl chloride, there is formed the corresponding acid halide or salt thereof, e.g., 2-phenyl-4-guanidinobenzoyl chloride hydrochloride.

The reaction of the 6-aminopenicillianic acid ester and the guanidino-substituted organic acid is conveniently carried out by contacting the reactants in the presence of a carbodiimide such as 1,3-dicyclohexyl carbodiimide or 1,3-diisopropyl carbodiimide, in the presence of a suitable solvent at room temperature. After completion of the reaction, the urea formed from the dicarbodiimide is separated from the reaction mixture and the desired penicillin ester is recovered from the resulting solution in accordance with methods well known in this art.

The ester of the new penicillin so obtained is readily converted to the free acid by catalytic hydrogenation. This catalytic hydrogenation is preferably carried out using a noble metal catalyst such as palladium, platinum or rhodium; preferably supported on an inert carrier such as carbon, barium carbonate, diatomaceous earth, and the like. After completion of the hydrogenation, the free penicillanic acid is recovered from the hydrogenation reaction mixture by procedures known in the art.

The new compounds of our invention include penicillins which contain a guanidino-substituted aryl substituent attached to the acyl portion of the penicillin molecule. These new penicillins may be prepared as described above by reaction of an appropriately substituted alkanoic acid or acid halide with either a 6-aminopenicillanic acid or an ester thereof. The organic acid or acid halide selected is preferably one having a monocyclic aryl substituent attached to the carboxylic acid wherein the monocyclic aryl substituent is further substituted by a guanidino- or a guanidinomethyl radical. In addition to the guanidino- or guanidinomethyl substituent, the carboxylic acid or acid halide may contain other substituents attached to the monocyclic aryl nucleous or to some other position of the alkanoic acid carbon chain. Examples of guanidinoaryl- or guanidinomethylaryl penicillins as well as the guanidinoaralkyl- or guanidinomethylaralkyl penicillins also include those in which a hetero atom or a heterocyclic ring is interposed between the aryl nucleus and the amide linkage of the penicillin molecule. Specific penicillins that are included in the scope of our invention are: 2-phenyl-4-guanidinophenyl penicillin; 2-ethoxy-4-guanidinonaphthyl penicillin; 2,6-dimethoxy-4-guanidinophenyl penicillin; 2-phenyl-4-guanidinomethylphenyl penicillin; 2-ethoxy-4-guanidinomethylnaphthyl penicillin; 2,6-dimethoxy-4-guanidinomethylphenyl penicillin; 4-guanidinobenzyl penicillin; 2-amino-4-guanidinobenzyl penicillin; 4-guanidinophenoxymethyl penicillin; α-(4-guanidinophenoxy)-ethyl penicillin; 3 - (4-guanidinomethylphenyl)-4-isoxazolyl penicillin; 5-methyl-3-(4-guanidinophenyl)-4-isoxazolyl penicillin; α - amino-4-guanidinobenzyl penicillin; α-(4-guanidinophenoxy)-propyl penicillin; γ-(4-guanidinophenoxy)-propyl penicillin; 5-methyl-3-(2-chloro-4-guanidinophenyl)-4-isoxazolyl penicillin; 4-guanidinomethylbenzyl penicillin; 4-guanidinomethylphenoxymethyl penicillin; α-(4-guanidinomethylphenoxy)-ethyl penicillin; β-(4-guanidinomethylphenoxy)-ethyl penicillin; 5-methyl-3-(4-guanidinomethylphenyl)-4-isoxazolyl penicillin; α-amino-4-guanidinomethylbenzyl penicillin; α-(4-guanidinomethylphenoxy)-propyl penicillin; γ-(4-guanidinomethylphenoxy)-propyl penicillin; 5-methyl-3-(2-chloro - 4 - guanidinomethylphenyl)-4-isoxazolyl penicillin; and 5-ethyl-3-(4-guanidinophenyl)-4-isoxazolyl penicillin. These penicillins can be obtained in the form of their inner salts, or they can be reacted with acids to obtain the corresponding penicillin acid salts. The inner salts and the non-toxic acid salts can be admixed with suitable non-toxic liquid or solid pharmaceutical carriers for administration to man and animals. These pharmaceutical preparations can contain other active therapeutic agents, and may be administered either orally or parenterally.

The new penicillins and their non-toxic salts are valuable antibacterial agents which are useful therapeutic agents in poultry and other animals, including man, in the treatment especially of infections caused by susceptible gram-positive and gram-negative bacteria. They are also useful as nutritional supplements in animal feeds.

The following examples are provided as illustrations of the methods of preparing the novel penicillins and the non-toxic salts thereof as well as the new guanidino-substituted organic acid intermediates in the production of the new penicillins of our invention.

EXAMPLE 1

4-guanidinophenyl penicillin

Approximately 650 mg. of solid 4-guanidinobenzoyl chloride hydrochloride is added in small amounts to a stirred solution of 648 mg. of 6-aminopenicillanic acid in 8.5% aqueous sodium bicarbonate solution. The pH of the reaction mixture is maintained in the range of 7.8 during the course of the reaction by the continuous addition of a saturated aqueous solution of sodium bicarbonate. The reaction mixture is then allowed to stir for approximately 45 minutes and the formed 4-guanidinophenyl penicillin precipitates from the reaction mixture. The precipitated product is recovered by filtration and purified by recrystallization from an acetone-water mixture. The product thus obtained inhibits *Staphylococcus aureus* at the concentration of 3.9 mcg./ml.

The 4-guanidinobenzoyl chloride hydrochloride used as the starting material is prepared from p-amino-benzoic acid in the following manner. A solution of 1.5 g. of p-aminobenzoic acid, 1.62 g. of benzoyl cyanamide in 5 ml. of ethanol are evaporated to dryness at steam bath temperature. An additional 5 ml. of ethanol is added and the evaporation repeated in a similar manner. The residue is stirred for 1 hour in 5% aqueous sodium bicarbonate solution and filtered. To the filtrate is added 4 equivalents of sodium hydroxide, and the resulting solution maintained at reflux temperature for approximately 20 minutes. The solution is then decolorized with activated charcoal and to the decolorized filtrate is added an additional 6 equivalents of sodium hydroxide and maintained at room temperature for approximately 30 minutes. Acidification of the solution with glacial acetic acid effects crystallization of p-guanidinobenzoic acid, which is recovered by filtration and dried.

A mixture is prepared containing 5 cc. of thionyl chloride, 3 drops of pyridine, and 537 mg. p-guanidinobenzoic acid. The mixture is heated and stirred for approximately 1 hour and benzene is added to precipitate the formed 4-guanidinobenzoyl chloride hydrochloride. The precipitate is recovered by centrifugation and dried under vacuum.

EXAMPLE 2

5-methyl-3-(4-guanidinophenyl)-4-isoxazolyl penicillin

A mixture of 400 mg. of 5-methyl-3-(4-guanidinophenyl)-4-isoxazolylcarboxylic acid and 4 ml. thionyl chloride are stirred at reflux temperature for approximately 15 minutes. The reaction mixture is concentrated in vacuo to remove excess thionyl chloride, leaving as a residue 5-methyl-3-(4-guanidinophenyl)-4-isoxazolylcarboxlic acid chloride hydrochloride. The residual acid chloride is dissolved in 5 ml. of dry acetone and the resulting solution added to a solution containing 283 mg. of 6-aminopenicillanic acid dissolved in a small amount of saturated sodium bicarbonate solution. The mixture is stirred for approximately 30 minutes at a temperature of 0 to 5° C. while adding aqueous sodium bicarbonate solution to maintain the pH between about 7 and 8, and the precipitate which forms is removed by filtration and discarded leaving the product dissolved in the filtrate. The filtrate is concentrated under vacuum until the 5-methyl-3-(4-guanidinophenyl) - 4 - isoxazolyl penicillin precipitates and is recovered by filtration. This product inhibits *Staphylococcus aureus* at a concentration of 3.9 mcg./ml.

The 5-methyl-3-(4-guanidinophenyl)-4-isoxazolylcarboxylic acid is prepared by reaction of p-nitrobenzaldehyde with hydroxylamine hydrochloride to obtain p-nitrobenzaldoxime, which is converted through the p-nitrobenzohydroximic chloride by treatment with HCl and chlorine gas and subsequently converted by treatment with ethylacetoacetate in the presence of a strong base to obtain ethyl [5-methyl-3-(4-nitrophenyl)-4-isoxazolyl]-carboxylate which is hydrolyzed to the corresponding free acid with sodium hydroxide. The acid obtained is hydrogenated in the presence of a catalyst to produce 5-methyl-3-(4-aminophenyl)-4-isoxazolylcarboxylic acid which is reacted with benzoyl cyanamide in the presence of sodium hydroxide to yield the desired acid. These reactions are described in detail as follows.

To a stirred solution of 50 g. p-nitrobenzaldehyde in 500 ml. pyridine is added 25.3 g. hydroxylamine hydrochloride. The solution which forms is heated for approximately 1 hour at steam bath temperature. To the solution is added 3 volumes of water and the solution cooled until the product, p-nitrobenzaldoxime, crystallizes from solution. The crystalline product is recovered by filtration and recrystallized from an ethanol-water mixture.

Approximately 52 g. p-nitrobenzaldoxime is suspended in 202 ml. of 8.3 N aqueous hydrochloric acid and the resulting mixture cooled to 0° C. Chlorine gas is bubbled through the solution for approximately 1 hour, whereupon crystalline p-nitrobenzaldoxime chloride crystallizes from solution and is recovered by filtration.

To a solution of 18.2 g. sodium methoxide in 113 ml. of methanol is added rapidly 44 g. ethylacetoacetate. After stirring the solution for approximately 10 minutes, it is cooled to −25° C.

A solution of 51 g. p-nitrobenzaldoxime chloride in 113 ml. methanol is cooled to approximately 10° C. and added to the previously-prepared solution of ethylacetoacetate at a rate such that the temperature of the reaction mixture is held below 0° C. with cooling. The resulting mixture is stirred for approximately 18 hours at 25° C., whereupon an orange precipitate of ethyl [5-methyl-3-(4-nitrophenyl)-4-isoxazolyl]-carboxylate precipitates and is recovered by filtration. The recovered product is washed with methanol and water and purified by recrystallization from a methanol-ether mixture.

A solution of 43 g. of ethyl [5-methyl-3-(4-nitrophenyl)-4-isoxazolyl]-carboxylate in 755 ml. of methanol is heated to reflux temperature under an atmosphere of nitrogen, and to it is added a solution of 167 ml., 1 N aqueous sodium hydroxide, and the temperature maintained at reflux for approximately 1½ hours. The solution is then cooled to 25° C., 20 ml. of concentrated glacial acetic acid is added, and the solution is concentrated in vacuo until the product precipitates. Water is added to the reaction mixture to complete precipitation of the product which is recovered from solution by filtration, washed and dried. Recrystallization from ethanol gives substantially pure 5-methyl-3-(4-nitrophenyl)-4-isoxazolylcarboxylic acid.

To 1 g. of 5% rhodium-on-carbon catalyst, which is pre-reduced with hydrogen, is added a solution of 2.4 g. 5-methyl-3-(4-nitrophenyl)-4-isoxazolylcarboxylic acid in 250 ml. methanol. The resulting mixture is agitated continuously and hydrogenated under 40 pounds hydrogen pressure until hydrogenation appears to be substantially complete. The catalyst is removed from the solution by filtration and the solvent removed by concentration in vacuo, leaving the product as a residue. The residue is dissolved in ether and triturated with methanol. Further purification by extraction with ethyl acetate and removal of the solvent yields substantially pure 5-methyl-3-(4-aminophenyl)-4-isoxazolylcarboxylic acid.

Approximately 973 mg. of 5-methyl-3-(4-amino-phenyl)-4-isoxazolylcarboxylic acid and 362 mg. of benzoyl cyanamide are mixed in 5 ml. of ethanol and the solution evaporated to dryness at steam bath temperature. Addition of 5 ml. of ethanol to the residue and evaporation to dryness are repeated twice. The residue from the reaction mixture is suspended in 5% aqueous sodium bicarbonate solution, stirred for approximately 1 hour and filtered to remove unreacted starting material. To the filtrate is added approximately 250 mg. of sodium hydroxide and the resulting solution heated at reflux temperature in an atmosphere of nitrogen for approximately 15 minutes. The resulting solution is decolorized with activated charcoal and subsequently treated with approximately 750 mg. of sodium hydroxide and stirred at 25° C. for approximately 30 minutes. The product, 5-methyl-3-(4-guanidinophenyl)-4-isoxazolylcarboxylic acid is precipitated by neutralization of the alkaline solution with glacial acetic acid. The precipitated product is recovered by filtration and recrystallized from hot water.

EXAMPLE 3

4-guanidinophenoxymethyl penicillin

A mixture of 0.208 g. of 6-(4-guanidinophenoxy- acetamido)-penicillanic acid benzyl ester hydrochloride and 0.2 g. of 10% palladium-on-carbon catalyst in 10 ml. of 50% aqueous methanol is maintained under 40 pounds per square inch of hydrogen pressure for approximately 2 hours. The reduced reaction mixture is filtered to remove the catalyst and the catalyst is washed with 50% aqueous methanol to remove occluded product. The filtrate and washings containing the desired product are concentrated in vacuo to leave as a residue the desired product. The residue is further purified by countercurrent distribution between N-butanol and water and the substantially pure product, 4-guanidinophenoxymethyl penicillin, recovered from the aqueous phase.

The 6 - ′(4-guanidinophenoxyacetamido) - penicillanic acid benzyl ester hydrochloride is prepared by reaction of p-aminophenoxyacetic acid and s-methylisothionitrourea to yield as an intermediate product p-nitroguanidinophenoxy-acetic acid, which is hydrogenated to give as a second intermediate product p-guanidinophenoxyacetic acid hydrochloride, which material is reacted with 6-aminopenicillanic acid benzyl ester in the presence of N,N′-dicyclohexyl-carbodiimide in accordance with the following procedure.

A mixture of 1.4 g. of p-aminophenoxyacetic acid and and aqueous solution of sodium hydroxide containing approximately 10 milliequivalents of sodium hydroxide 2 ml. dimethyl formamide and 1.4 g. of s-methylisothionitrourea are stirred at 60° C. for 1.5 hours. The resulting solution is cooled and 10 milliequivalents of dilute hydrochloric acid is added to precipitate the formed 4-nitroguanidinophenoxyacetic acid. The product is recovered by filtration, air dried and dissolved in aqueous sodium hydroxide. The sodium hydroxide solution is filtered to remove extraneous material and washed with ethylacetate. Substantially pure 4-nitroguanidinophenoxyacetic acid is crystallized from the aqueous solution by acidification and cooling. The crystalline material is recovered by filtration and dried. M.P. 239° C. (d.).

Approximately 7.3 g. of 4-nitroguanidinophenoxyacetic acid is dissolved in 450 ml. of 90% aqueous methanol and reduced with hydrogen at 40 pounds per square inch hydrogen pressure in the presence of 4.5 g. of 10% palladium-on-carbon catalyst until approximately 4 moles of hydrogen are taken up. The catalyst is removed from the reaction mixture by filtration and washed with methanol. The solid catalyst mixture is extracted with boiling water to dissolve the reduced product and filtered. The filtrate containing the product is concentrated to a small volume and treated with dilute hydrochloric acid to produce 4-guanidinophenoxyacetic acid hydrochloride, which is recovered by evaporating the aqueous solution to dryness in vacuo. M.P. 170° C.

Approximately 518 mg. of N,N-dicyclohexylcarbodiimide and 779 mg. of 6-aminopenicillanic acid benzyl ester are dissolved in 0.87 ml. of dimethyl formamide. To the resulting solution is added a solution of 500 mg. of 4-guanidinophenoxyacetic acid hydrochloride and 0.87 ml. of dimethyl formamide, and the resulting mixture allowed to stand for 1 hour at 25° C. The reaction mixture containing the product is centrifuged to separate the layers and the supernatant layer removed. The residue material is washed with an equal mixture of dimethyl formamide and methylene chloride and again centrifuged and the supernatant layer removed. The supernatant layers are combined and diluted with ether to precipitate an oil containing the desired product. The product is obtained in solid form by trituration with ether. The resulting crude solid is dissolved in methylene chloride and reprecipitated with ether to remove unreacted 6-aminopenicillanic acid benzyl ester. The precipitated product is submitted to counter-current distribution between N-butanol and water, whereby substantially pure 6-(4-guanidinophenoxyacetamido)-penicillanic acid benzyl ester hydrochloride is obtained in the butanol phase.

EXAMPLE 4

4-guanidinomethylphenyl penicillin

A mixture of 153 mg. of benzyl 6-(4- guanidinomethylbenzamido)-penicillanate hydrochloride, 10 mg. of sodium bicarbonate and 300 mg. of 10% palladium-on-carbon catalyst in 17 ml. of 90% aqueous methanol are hydrogenated at 25° C. under hydrogen at atmospheric pressure for a period of about 45 minutes. The catalyst is removed from the reaction mixture by filtration and washed with methanol to remove occluded product. The combined filtrate and washings are concentrated under reduced pressure to remove the methanol and the residual material containing the product, 4-guanidinomethylphenyl penicillin, is lyophilized to yield amorphous solid product. The product thus obtained inhibits Staphylococcus aureus at a concentration of 7.8 mcg./ml.

The benzyl 6-(4-guanidinomethylbenzamido) - penicillanate hydrochloride is prepared by hydrogenation of p-cyanobenzoic acid to obtain as an intermediate product p-aminomethylbenzoic acid which is reacted with o-methylisourea in alkaline solution to produce p-guanidinomethylbenzoic acid as a second intermediate product which is, in turn, reacted with benzyl 6-aminopenicillanate in the present of dicyclohexylcarbodiimide in the following manner.

A solution of 2 g. p-cyanobenzoic acid in 40 ml. of ethanol saturated with ammonia, and 2 g. Raney nickel catalyst are hydrogenated at 85° C. under 1500 pounds per square inch of hydrogen pressure. The hydrogenation reaction mixture is filtered to remove the catalyst and the product recovered from the filtrate by acidification with 2.5 N HCl, whereupon crystalline p-aminomethylbenzoic acid precipitates from solution and is recovered by filtration.

A solution of 1.2 g. of p-aminomethylbenzoic acid in 16 ml. of water containing 3.76 ml. of concentrated ammonium hydroxide is prepared and mixed with 2.26 g. of o-methylisourea hydrochloride. The resulting reaction mixture is stirred for about 18 hours and filtered to remove the precipitated product. The product is dissolved in hot aqueous ethanol and reprecipitated by acidification of the solution to pH 2. The resulting product, substantially pure p-guanidinomethylbenzoic acid hydrochloride, is recovered by filtration and dried.

To a stirred solution of 500 mg. dicyclohexylcarbodiimide and 1 g. benzyl 6-aminopenicillanate in 2 ml. methylene chloride is added 374 mg. p-guanidinomethylbenzoic acid hydrochloride in 2 ml. dimethyl formamide. The resulting mixture is stirred at 25° C. for approximately 30 minutes and subsequently at 0 to 5° C. for approximately 2 hours. Methylene chloride is added to the reaction mixture of precipitate dicyclohexylurea, which is removed by filtration. To the filtrate containing the product is added ethyl ether to precipitate 4-guanidinomethylphenyl penicillin benzyl ester hydrochloride. The precipitated product is isolated in substantially pure form by further trituration with additional amounts of ether.

EXAMPLE 5

4-guanidinomethylbenzyl penicillin

Following the procedures described in the preceding example, p-cyanophenylacetic acid is converted by catalytic hydrogenation to p-aminomethylphenylacetic acid which is, in turn, reacted with o-methylisourea hydrochloride in concentrated ammonium hydroxide to produce p-guanidinomethylphenylacetic acid which is isolated as the hydrochloride. This product is contacted with benzyl 6-aminopenicillanate in the presence of dicyclohexylcarbodiimide to form the benzyl ester of 4-guanidinomethylbenzyl penicillin hydrochloride which is hydrogenated in the presence of paladium catalyst to yield 4-guanidinomethylbenzyl penicillin.

EXAMPLE 6

4-guanidinobenzyl penicillin

A mixture of 0.2 g. of p-guanidinophenylacetic acid and 0.3 ml. of thionyl chloride is prepared and allowed to stand for approximately 10 minutes at 25° C. To the reaction mixture is added approximately 10 ml. of ether to precipitate the product as a gummy residue. The residual material is collected by centrifugation and the supernatant liquid discarded. The product, p-guanidinophenylacetyl chloride hydrochloride, is crystallized by treatment with 1 ml. of acetone. The resulting crystalline material is separated from the supernatant liquid, washed with ether and dried, leaving substantially pure p-guanidinophenylacetyl chloride hydrochloride. M.P. 127–130° C. dec.

To the product obtained in this manner is added, with stirring, 0.23 g. of sodium 6-aminopenicillianate in a mixture of 1 ml. of tetrahydrofuran and 1 ml. of water, followed by 2 ml. of 0.5 N aqueous sodium bicarbonate solution. The mixture is stirred for 10 minutes at a temperature of about 25° C. and centrifuged, the product remaining in the supernatant liquid. The supernatant liquid is evaporated to dryness in vacuo, leaving as a residue 4-guanidinobenzyl penicillin, which is furthetr purified by washing with sodium bicarbonate solution and water, and dried. M.P. 195–200° C. dec. The protduct thus obtained inhibits *Staphylococcus aureus* at a concentration of 0.24 meg./ml.

The p-guanidinophenylacetic acid employed in the above reaction is prepared from p-aminophenylacetic acid by reaction with 1-nitro-2-methylisothiourea to yield as an intermediate product p-nitroguanidinophenylacetic acid, which is catalytically reduced in the presence of Raney nickel to yield as a product p-guanidinophenylacetic acid in accordance with the following procedure.

To a solution of 6.04 g. of p-aminophenylacetic acid in 50 ml. of water and 15 ml. of 2.7 N sodium hydroxide is added 5.4 g. of finely-ground 1-nitro-2-methylisothiourea. The mixture is stirred at room temperature for 16 hours, filtered, then carefully acidified with cooling. The product which crystallizes out is recrystallized from water, giving 4.4 g. of p-nitroguanidinophenylacetic acid. M.P. 188–190° C.

One gram of Raney nickel is added to a hot solution of 2.0 g. of p-nitroguanidinophenylacetic acid in 75 ml. of methanol and the mixture is refluxed for 15 minutes. The combined filtered solution and washings (79 ml.) is mixed with 1 gram fresh Raney nickel and hydrogenated at approximately 40 pounds per square inch pressure at 25° C. Hydrogen absorption is complete after three hours. The hydrogenation reaction mixture is filtered to remove the catalyst. The filtrate, containing p-guanidinophenylacetic acid, is evaporated to dryness in vacuo, and the residue crystallized from water. The first crop weights 550 mg., gives a positive Sakaguchi test, and melts with decomposition at 320–2° C.

EXAMPLE 7

2,6-dimethoxy-4-guanidinophenyl penicillin

A solution of 274 mg. of 2,6-dimethoxy-4-guanidinobenzoic acid hydrochloride dissolved in 1 ml. of dimethyl formamide is added to a solution containing 0.31 g. 6-aminopenicillanic acid benzyl ester and 0.25 g. dicyclohexylcarbodiimide dissolved in 0.5 ml. of dimethyl formamide. The resulting reaction mixture is maintained at 25° C. for ½ hour and filtered to remove dicyclohexylurea obtained as a by-product. The filtered dicyclohexylurea containing occluded product is washed with approximately 2 ml. of methylene chloride to dissolve additional product and the washings and filtrate combinetd. To the filtrate is added 100 ml. of ether and the material which separates from solution triturated with ether to solidify the product, benzyl 6-(2,6-dimethoxy-4-guanidinobenzamido)-penicillanate hydrochloride. The solid product thus obtained is recovered by filtration and washed with ether.

A solution of 300 mg. of the product resulting from the preceding reaction in 15 ml. of 80% by volume aqueous methanol is hydrogenated under 40 p.s.i.g. hydrogen in the presence of 10% paladium-on-charcoal catalyst for approximately 2 hours. The catalyst is removed by filtration and the filtrate containing the product neutralized to pH 7 with aqueous sodium bicarbonate solution. The filtrate containing the product is then evaporated to dryness in vacuo to obtain the residual solid comprising 2,6-dimethoxy-4-guanidinophenyl penicillin.

The 2,6-dimethoxy-4-guanidinobenzoic acid hydrochloride used in the preparation of the penicillins is prepared from 3-bromo-2,6-dimethoxybenzoic acid by first converting the acid to its benzyl ester, followed by reaction of the resulting benzyl ester with sodium amide in liquid ammonia to produce as an intermediate product benzyl-4-amino-2,6-dimethoxybenzoate which is, in turn, reacted with benzoyl cyanamide followed by hydrolysis, and the hydrolyzed product recovered by treatment with hydrochloric acid as 2,6-dimethoxy-4-guanidinobenzoic acid hydrochloride, in accordance with the following procedures.

A mixture of 11 g. of 3-bromo-2,6-dimethoxybenzoic acid and 3.7 g. of potassium carbonate and 6 ml. of benzyl bromide in 100 ml. of acetone is heated at the reflux temperature of the mixture for approximately 20 hours. The reaction mixture is filtered and the filtrate containing the product, benzyl-3-bromo-2,6-dimethoxybenzoate, evaporated to remove the acetone solvent, leaving the product as an oily residue. The product is purified by dissolving in 100 ml. ether, washing with aqueous sodium bicarbonate, and removal of the ether and unreacted benzyl bromide by concentration under reduced pressure (100° C. at 0.1 mm.) for approximately 1 hour to obtain the product as a residue.

To a solution of sodium amide prepared by the reaction of 1.2 g. sodium and 200 ml. liquid ammonia is added, with stirring, 11 g. of benzyl-3-bromo-2,6-dimethoxybenzoate, and stirring is continued for approximately 3½ hours. To the reaction mixture is added 3.5 g. of ammonium chloride, and the ammonia removed by evaporation. The residue containing the product benzyl-4-amino-2,6-dimethoxybenzoate is extracted with a mixture of 150 ml. ether and 150 ml. water, and the undissolved product recovered by filtration. Additional product is obtained from the ether extract by back extraction with aqueous dilute sulfuric acid. The aqueous acid extract is then neutralized to precipitate additional product. The combined product is then recrystallized from methanol. M.P. 115–116° C. The N.M.R. spectrum confirms that the thus-obtained product is benzyl-4-amino-2,6-dimethoxybenzoate.

A mixture of 574 mg. of benzyl-4-amino-2,6-dimethoxybenzoate and 324 mg. of benzoyl cyanamide in 5 ml. of ethanol is heated at steam bath temperature for 30 minutes, during which time the ethanol evaporates. The residue is diluted with an additional 5 ml. of ethanol and evaporation and heating are continued for an additional 1½ hours. The residual material is then contacted with 5 ml. ethanol and 0.5 ml. of 11.7 N sodium hydroxide solution and the resulting mixture heated for approximately 45 minutes and then allowed to stand at 25° C. for approximately 18 hours. The residue thus obtained is dissolved in 20 ml. water and the water solution of the product washed with 20 ml. of ether. The aqueous solution of the product is acidified to about pH 2 and washed with ether to remove benzoic acid. The aqueous solution is then concentrated to 10 ml. and neutralized with aqueous sodium bicarbonate to precipitate 2,6-dimethoxy-4-guanidinobenzoic acid which is recovered by filtration and washed with water. The product thus obtained melts with decomposition at about 220° C.

The product thus obtained is dissolved in 1 ml. of aqueous hydrochloric acid and the solution evaporated to dryness to obtain as a residue 2,6-dimethoxy-4-guanidinobenzoic acid hydrochloride which is crystallized by stirring with acetone and recovered by filtration and washed with ether. M.P. dec. 220° C.

Various changes and modifications of the invention can be made, and to the extent that such variations incorporate the spirit of this invention, they are intended to be included within the scope of the appended claims.

What is claimed is:
1. A compound of the formula

or

wherein A represents phenyl or naphthyl, G represents guanidino or guanidinomethyl, B represents lower alkylene, substituted lower alkylene wherein the substituent is amino, or oxylower alkylene, $R_1$ and $R_2$ represent hydrogen, phenyl, lower alkoxy, chloro or amino, and X represents chloro or hydroxy.

2. A compound of claim 1 which is p-guanidinophenoxyacetic acid.
3. A compound of claim 1 which is p-guanidinomethylbenzoic acid.
4. A compound of claim 1 which is p-guanidinomethylphenylacetic acid.
5. A compound of claim 1 which is p-guanidinophenylacetic acid.
6. A compound of claim 1 which is 2,6-dimethoxv-4-guanidinobenzoic acid.
7. A compound of claim 1 which is p-guanidinophenyl acetyl chloride.

References Cited

UNITED STATES PATENTS 2,820,822    1/1958    Skelly _____ 260—518

LORRAINE A WEINBERGER, Primary Examiner

L. ARNOLD THAXTON, Assistant Examiner

U.S. Cl. X.R.

260—239.1, 307, 519, 544, 999